US009382076B1

(12) United States Patent
Earling et al.

(10) Patent No.: US 9,382,076 B1
(45) Date of Patent: Jul. 5, 2016

(54) CONVEYING AND ACCUMULATING SYSTEM WITH PRODUCT ALIGNMENT WHEEL

(71) Applicants: Michael T Earling, Folsom, NJ (US); John G Neil, Clementon, NJ (US)

(72) Inventors: Michael T Earling, Folsom, NJ (US); John G Neil, Clementon, NJ (US)

(73) Assignee: Garvey Corporation, Blue Anchor, NJ (US)

( * ) Notice: Subject to any disclaimer, the term of this patent is extended or adjusted under 35 U.S.C. 154(b) by 0 days.

(21) Appl. No.: 14/790,481

(22) Filed: Jul. 2, 2015

(51) Int. Cl.
*B65G 1/00* (2006.01)
*B65G 47/244* (2006.01)
*B65G 47/68* (2006.01)
*B65G 47/84* (2006.01)

(52) U.S. Cl.
CPC ............ *B65G 47/244* (2013.01); *B65G 47/684* (2013.01); *B65G 47/846* (2013.01)

(58) Field of Classification Search
CPC .................... B65G 2047/687; B65G 47/5145; B65G 47/684; B65G 47/846

USPC ............................ 198/347.1, 347.4, 453, 454
See application file for complete search history.

(56) References Cited

U.S. PATENT DOCUMENTS

| | | | | |
|---|---|---|---|---|
| 2,763,359 A * | 9/1956 | Rose | .................... | B65G 47/684 198/417 |
| 3,866,739 A * | 2/1975 | Sikorski | ............... | B65G 47/682 198/415 |
| 4,054,201 A * | 10/1977 | Rollinger | ............. | B65G 47/682 198/455 |
| 7,252,186 B2 * | 8/2007 | Paquin | ................... | B65G 15/06 198/347.4 |
| 7,322,459 B2 * | 1/2008 | Garvey | ................ | B65G 47/684 198/341.09 |
| 2005/0167239 A1 * | 8/2005 | Tarlton | ................. | B65G 47/684 198/347.4 |

* cited by examiner

*Primary Examiner* — James R Bidwell
(74) *Attorney, Agent, or Firm* — Stuart M. Goldstein

(57) ABSTRACT

A product conveying and accumulation system utilizes an alignment wheel which rotates non-aligned rectangular shaped bottles and containers, for smooth movement through the system. The alignment wheel is located at the product pinch point exit of the system, such that products which are out of alignment are reoriented and aligned with the other products in the system, before proceeding to the downstream product destination.

18 Claims, 7 Drawing Sheets

CONVEYING AND ACCUMULATING SYSTEM WITH PRODUCT ALIGNMENT WHEEL

BACKGROUND OF THE INVENTION

Product accumulation systems are routinely used in conjunction with conveyors for the storage and accumulation of product which is fed from an upstream source onto conveyors. In the normal operation of this type of system, product is placed on a conveyor at the upstream location, for instance at one operational station, and then transported to a downstream destination by conveyor where the next step in the manufacture or distribution of the product is to be accomplished.

In the past, it was not uncommon that during this process, there may be a disruption at a downstream location caused by a malfunction of machinery, some constraining problem, or other circumstance which prevents downstream machine from accepting products. Continued operation of production upstream may result in the build-up of line back pressure which could cause a further problem in permitting the unrestricted movement of product. However, if such a disruption is one which can be addressed relatively quickly, upstream product which normally would be transported to the malfunctioning location, can be received and temporarily stored by an accumulator which is integral to the system.

Product disruptions problem have been effectively addressed in conveyor/accumulator systems by the unique product conveying and accumulation system disclosed in U.S. Pat. No. 6,575,287. However, while this system operates efficiently to eliminate product disruptions for products and their containers of many sizes, shapes and stability characteristics, disruptions in the movement of containers of certain configurations are more difficult to eliminate. In particular, many bottles or containers which are rectangular in shape, that is have flat front, back and sides meeting at right angle corners, tend to get rotated out of their proper product alignment, as they move through the system. These aberrant containers tend to tip over or otherwise impede the movement of train of containers, thus causing the costly disruption.

SUMMARY OF THE INVENTION

It is thus the object of the present invention to provide a conveying and accumulation system which eliminates system disruptions resulting from the movement of rectangularly shaped bottles or containers.

This and other objects are accomplished by the present invention, a product conveying and accumulation system which utilizes an alignment wheel to rotate non-aligned rectangular shaped bottles and containers. The alignment wheel is located at the product pinch point exit of the system such that products which are out of alignment are reoriented and aligned with other products, before proceeding to their downstream destination.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
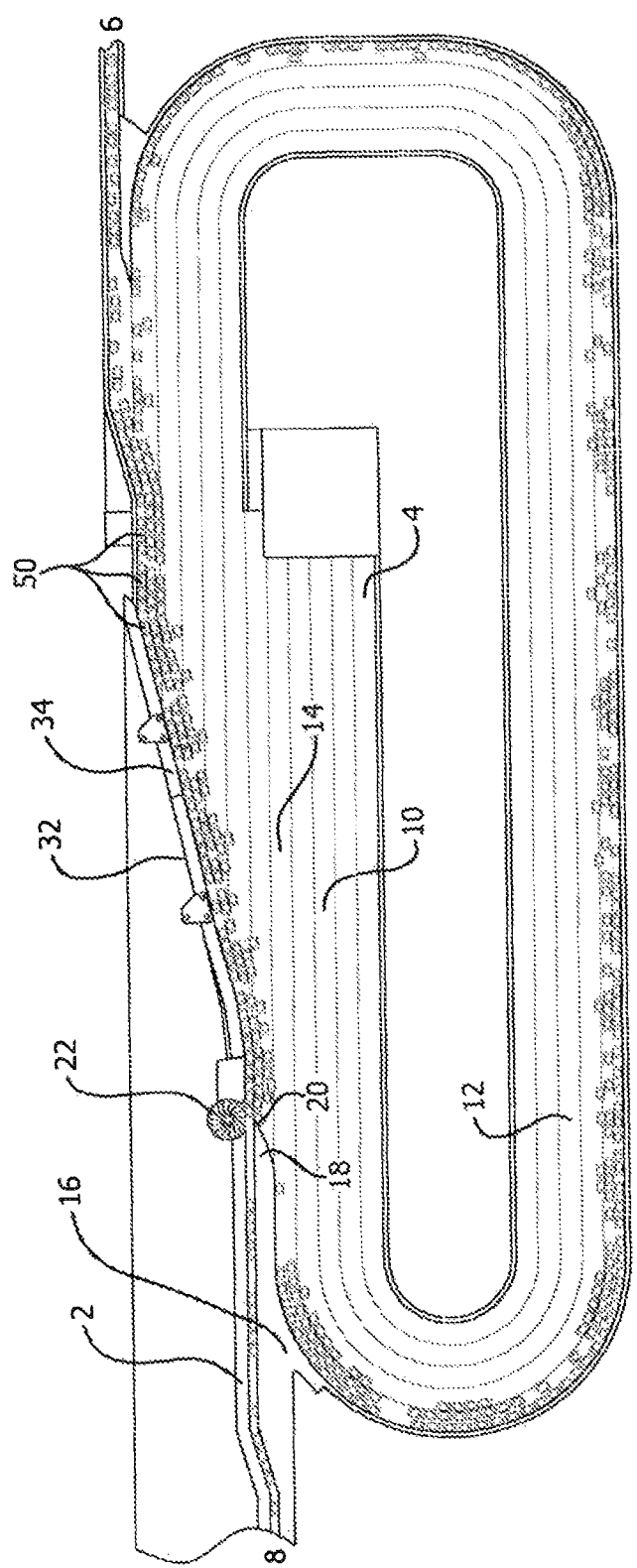
FIG. 1 is a top view of the product conveying and accumulation system of the present invention, showing the movement of rectangular bottles around the system and exiting to the downstream location.

A product conveying and accumulation system comprises conveyor or first conveyor means 2 and conveyor/accumulator or second conveyor means 4. Conveyor 2 is configured to move products, specifically rectangular shaped bottles 50, from an upstream location designated at 6, to a downstream destination, designated at 8, at a given, predetermined speed. Conveyor/accumulator 4, configured with multiple product lanes, comprises accumulator section 10 and recirculating section 12.

Product guide member 16 is positioned between conveyor 2 and accumulator section 10 at the location where bottles 50 exit the system to proceed to downstream destination 8. Guide 16 directs product on conveyor 2 to downstream destination 8 and also directs products for accumulation onto conveyor/accumulator. Guide 16 comprises outwardly extending section 18 having tip end 20.

Figure 4:
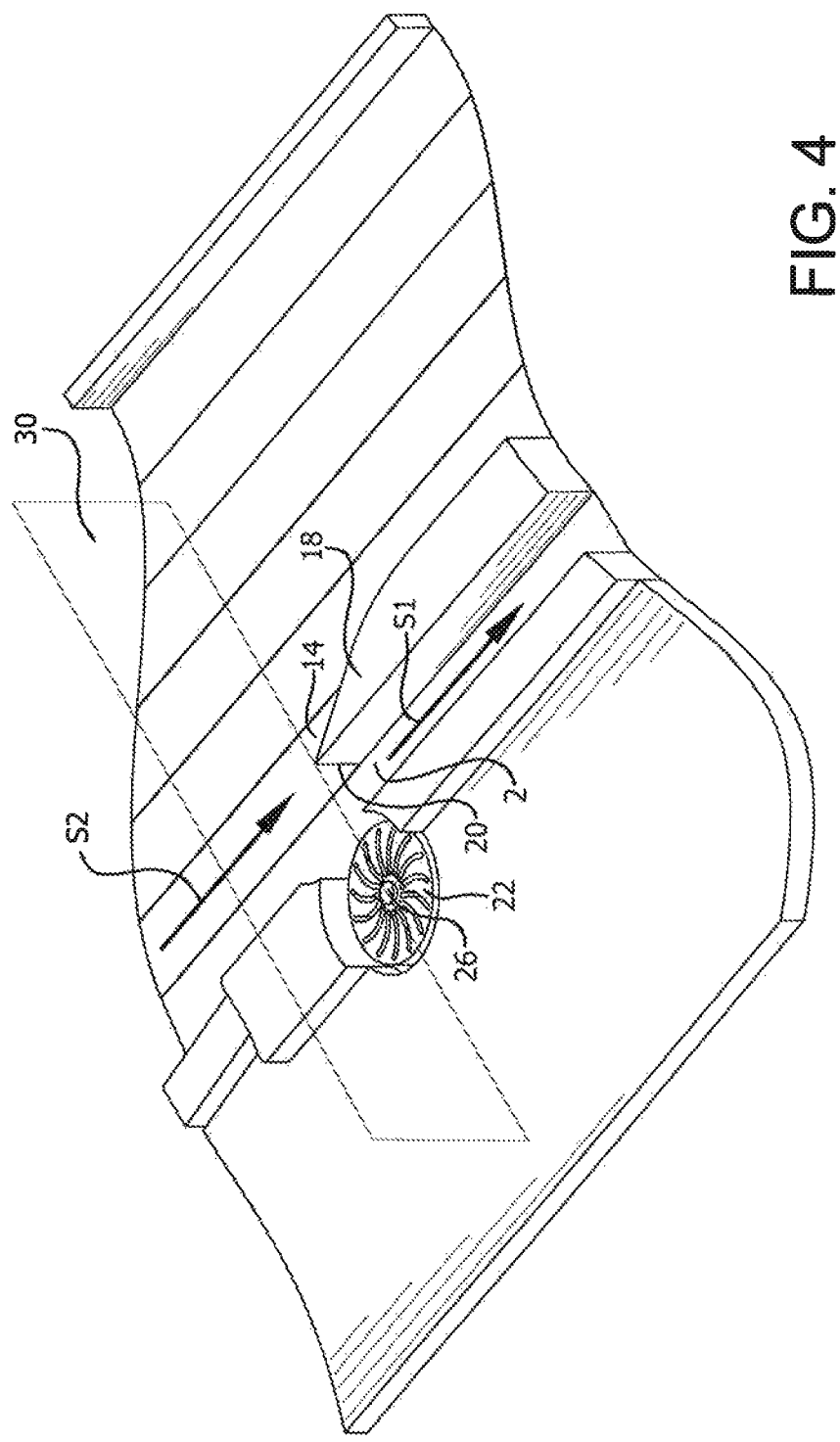
FIG. 4 is a partial perspective view showing the components of the system of the present invention which are located at its "pinch point.".

Product lane 14 of conveyor/accumulator 4 is located in adjacent alignment with conveyor 2, particularly at the alignment wheel 22 location. Conveyor 2 and product lane 14 of conveyor/accumulator 4 move in the same direction at the adjacent alignment. Although the system of the present invention can be operated with conveyor/accumulator 4 moving at the same linear speed as conveyor 2, the system operates optimally and with greatest efficiency when the conveyor travels at a faster linear speed S1, than the speed S2 of product lane 14 of the conveyor/accumulator. See FIG. 4.

Figure 2:
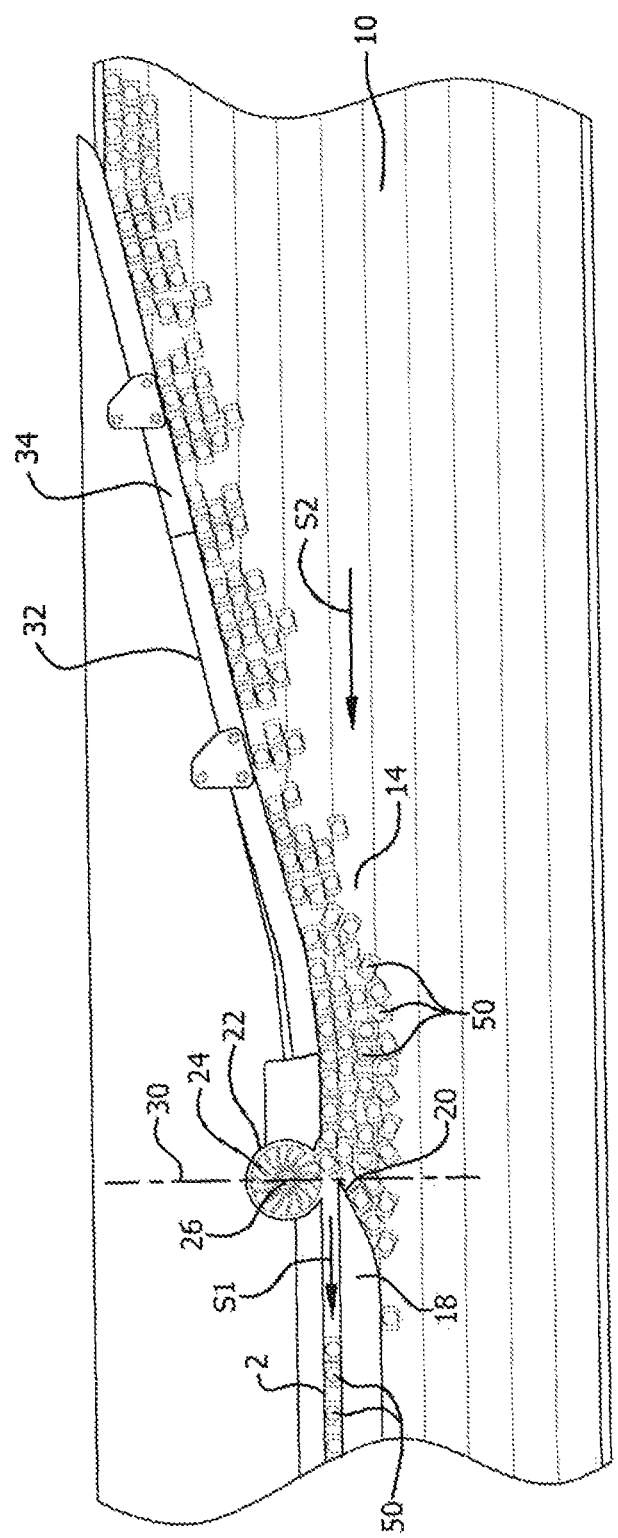
FIG. 2 is a close-up view of the "pinch point" location of the system of the present invention.

Alignment wheel 22 comprises spokes 24 and vertical rotating shaft 26. Alignment wheel 22 is positioned outboard of and adjacent to conveyor 2, with the center of the wheel and its shaft 26 aligned with and within the same vertical plane 30 as tip end 20 of guide 16. See FIGS. 2 and 4. This positioning of alignment wheel 22 in relation to tip end 20 is critical to the efficient and effective operation of the system.

Figure 5:
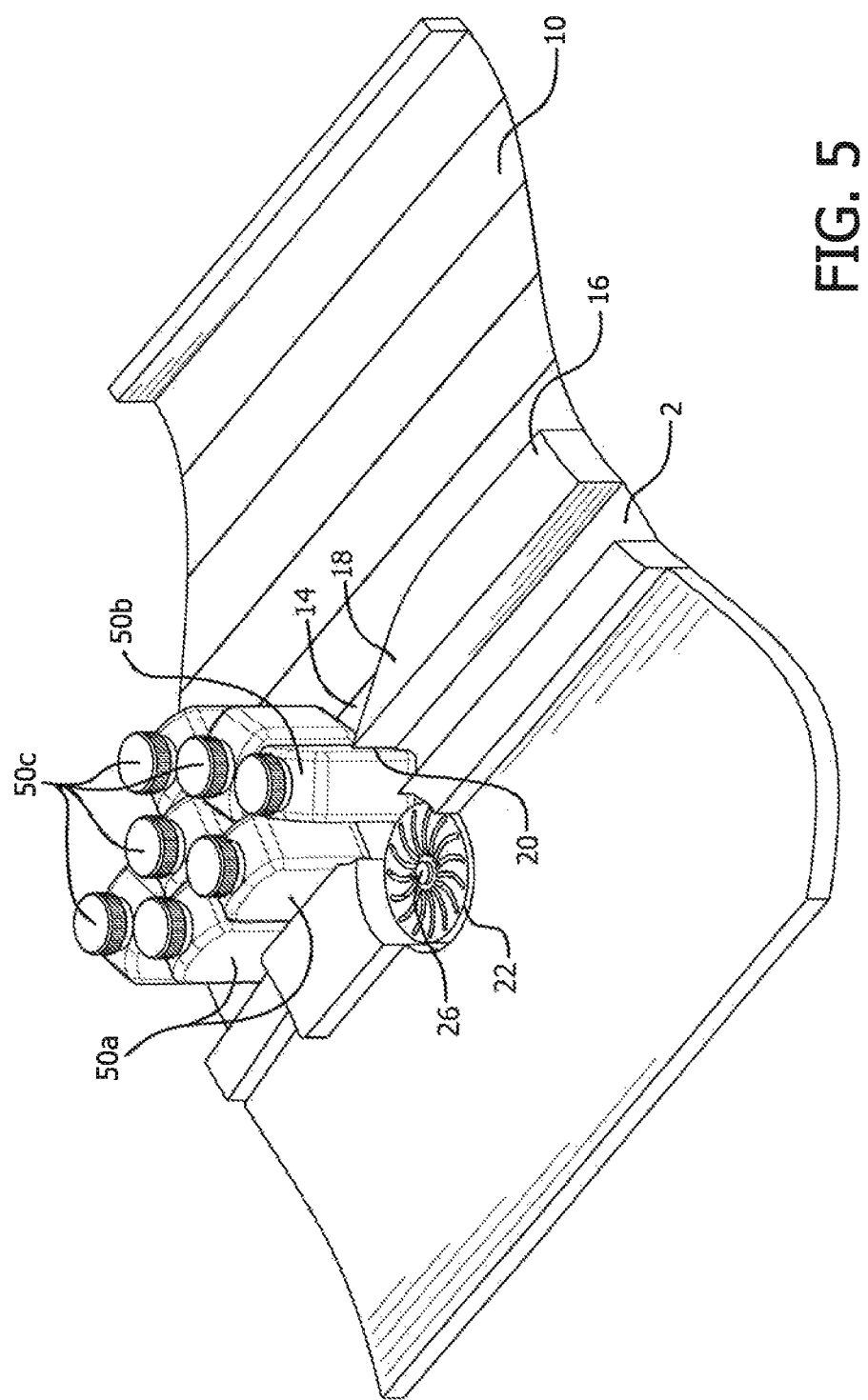
FIGS. 5-7 are partial perspective views of the "pinch point" location of the present invention, illustrating the manner of orientation of rectangular bottles.
Figure 6:
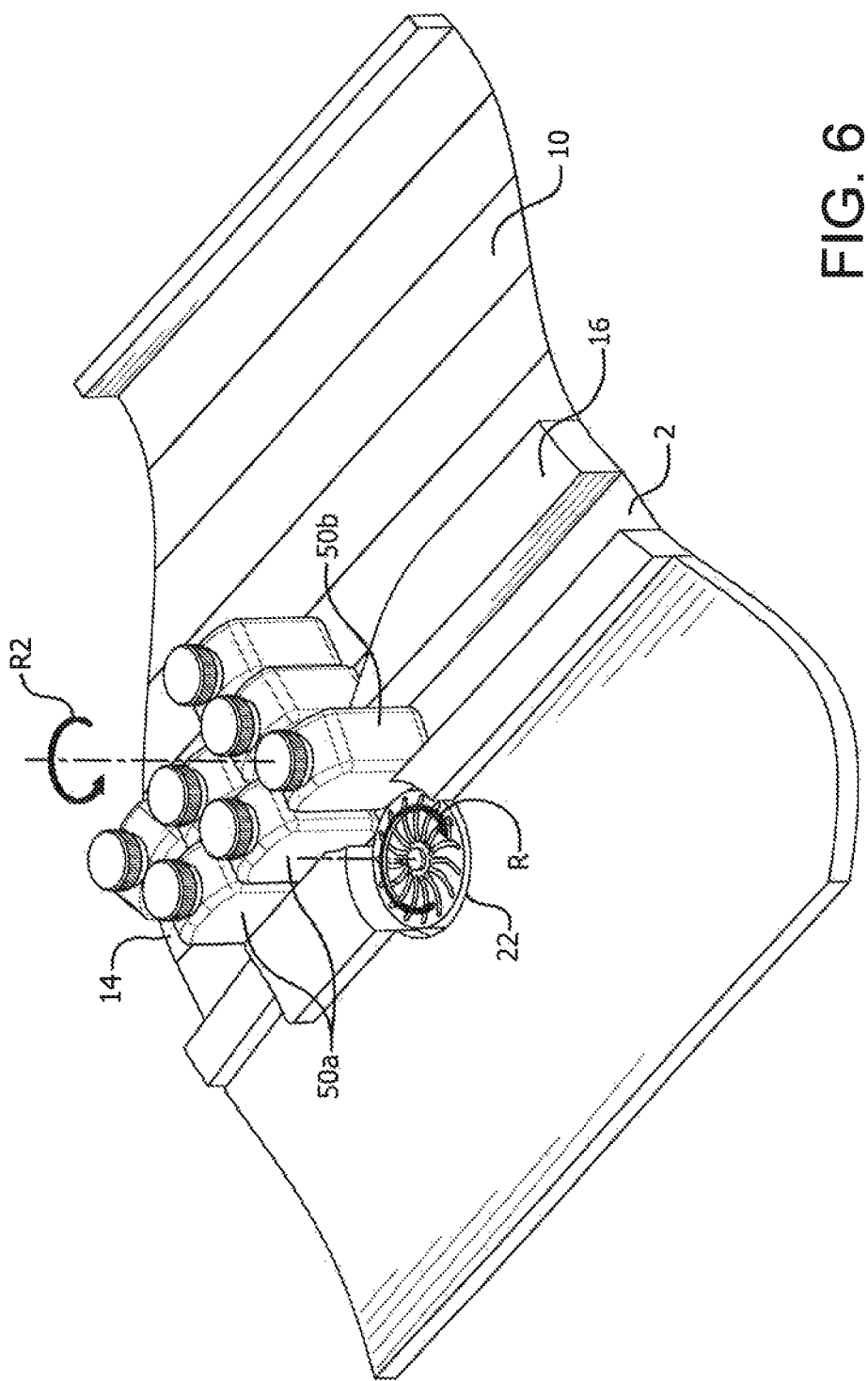
Figure 7:
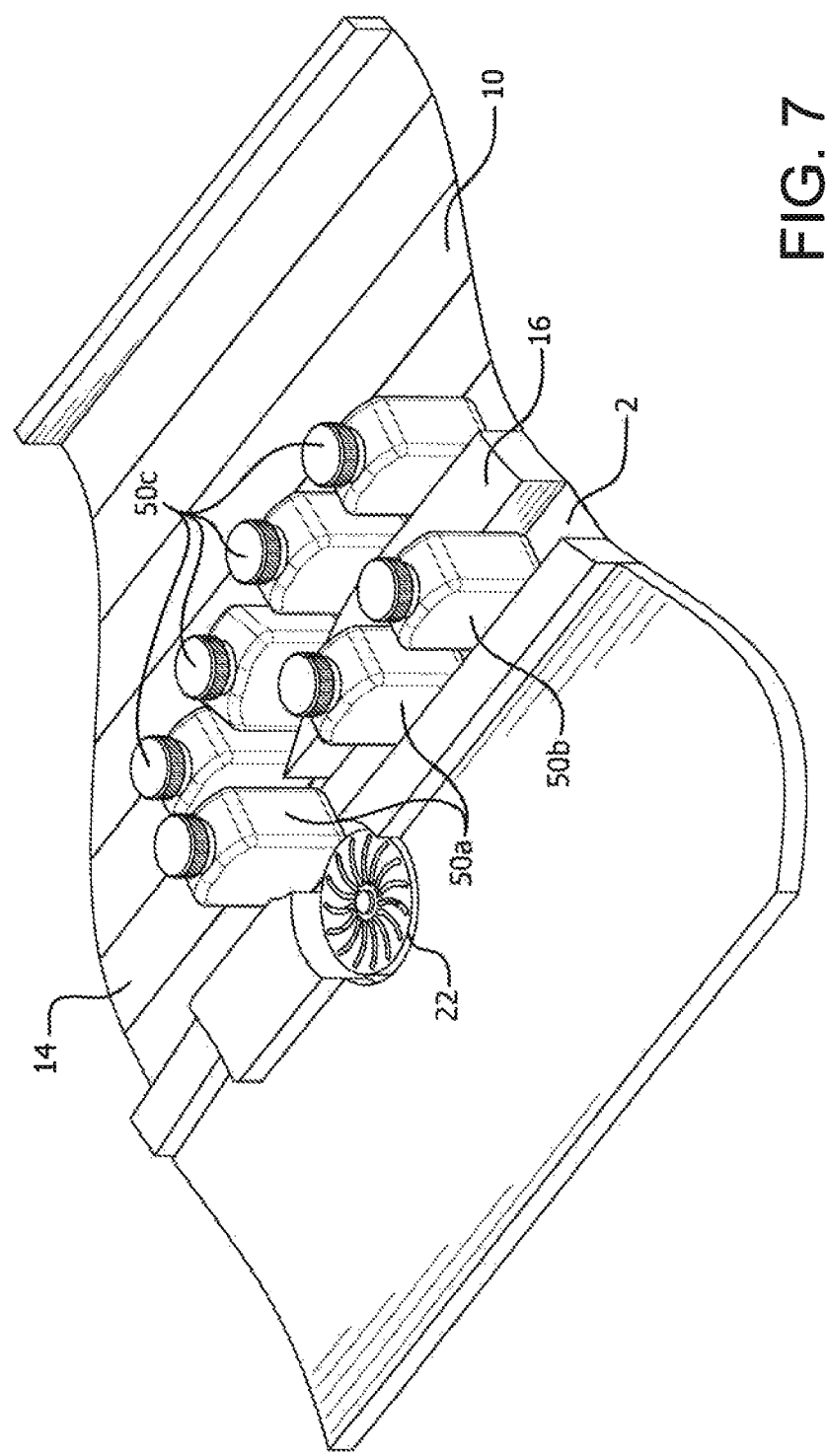

Also critical is the rotational speed R and the direction of rotation of alignment wheel 22. See FIG. 6. Rotational speed R of alignment wheel 22 must be identical to the linear speed S1 of conveyor 2. Alignment wheel 22 must also be rotating in the same direction as conveyor 2, a direction consistent and in tandem with the conveyor. For example when the direction of movement of containers 50 on conveyor 2 is west to east, as illustrated in FIGS. 5-7, alignment wheel 22 rotates in a clockwise direction. When the direction of movement of containers 50 on conveyor 2 is east to west, alignment wheel 22 rotates in a counter-clockwise direction.

Figure 3:
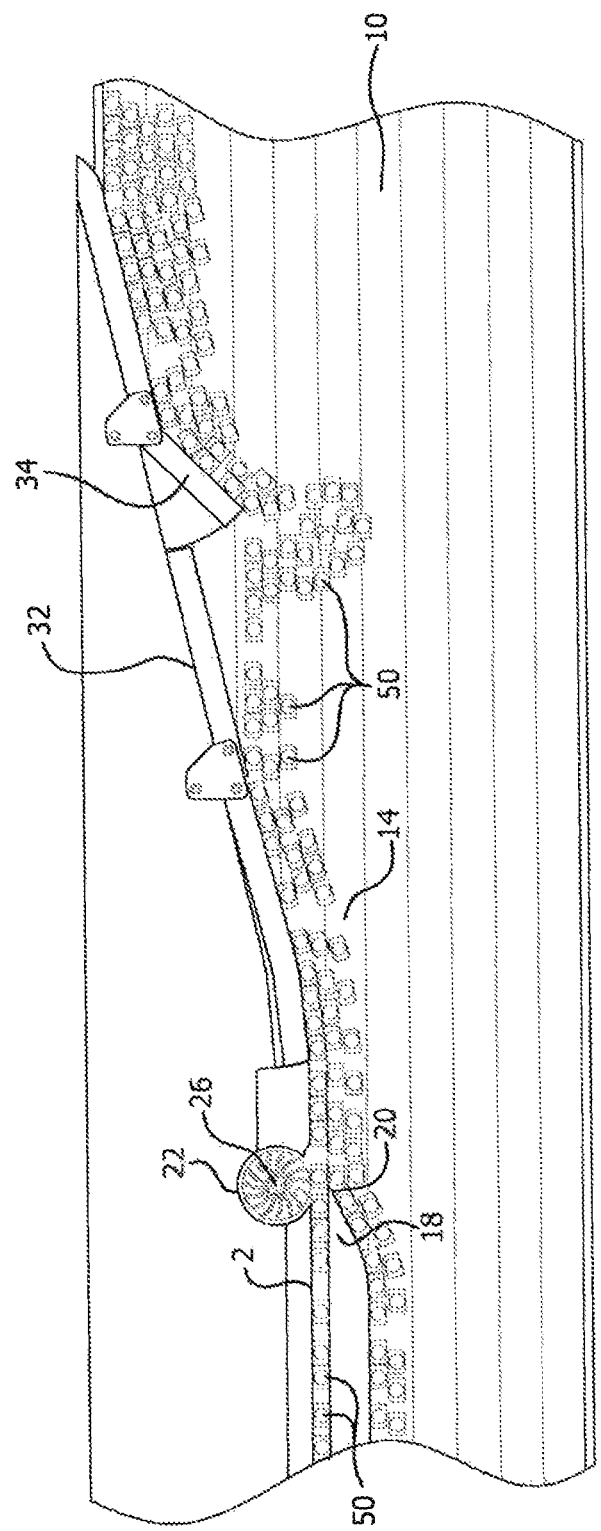
FIG. 3 is an additional close-up view of the "pinch point" location of the system of the present invention.

Outer rail 32 is adjacent to and borders conveyor 2 to maintain and assist in aligning bottles 50 as they travel toward guide 16. Product kick-out rail section 34 is rotatable to extend out from rail 32. Kick-out rail section 34 directs a given number of bottles 50 which are moving on outer lanes, i.e. lanes closer to outer rail 32 of accumulator section 10, to its further inboard lanes. See FIGS. 2 and 3. This movement of bottles inboard assists in preventing product congestion at tip end 20 of guide 16.

Basic movement of rectangular shaped bottles 50 is accomplished by operation of the conveyor/accumulator system which is known in the art. However, in order to ensure that rectangular bottles 50 travel unimpeded to downstream destination 8, the present invention guarantees that the sides of the bottles are all aligned with each other as they exit the system at guide member 16, as follows.

During normal movement of conveyor 2 and conveyor/accumulator 4, many of the bottles 50 have their sides aligned as they circulate around the system. See FIGS. 1-3. As bottles 50 approach guide member 16, and with specific reference to FIGS. 5-7, some of the bottles, e.g. bottles 50a, remain aligned for movement onto conveyor 2. However, other bottles, like bottle 50b, are askew, i.e. not aligned. Without the present invention, a bottle which is improperly aligned will not travel smoothly onto conveyor 2. Instead it will likely clog or block the product lane or even tip over, causing a disruption in the system.

However, as per the present invention, as non-aligned bottle 50b moves towards guide member 16, it ultimately contacts tip end 20 and rotating alignment wheel 22 simultaneously. When bottle 50b reaches this "pinch point" location, momentarily becoming wedged between tip end 20 and rotating alignment wheel 22, see FIG. 5, the wheel compels the bottle to rotate R2 into alignment with the aligned bottles 50a, see FIG. 6, for smooth unimpeded movement of bottles 50a and 50b to downstream destination 8. See FIG. 7. This efficient, reorienting movement of improperly aligned bottles into alignment is a direct function and result of the center of alignment wheel 22 being located in the same vertical plane 30 as tip end 20. Bottles 50c which are not directed onto conveyor 2 at this location, are directed back on to accumulator section 10 for recirculation.

This self-correcting alignment of rectangular shaped bottles is assisted by the positioning of kick-out rail section 34. As previously discussed, kick-out rail section 34 distributes bottles 50 to inboard lanes of accumulator section 10, to reduce the number of bottles approaching guide member 16 and thus relieve congestion at the pinch point created at tip end 20.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A product conveying and accumulation system, said system comprising:
 first conveying means for the movement of products in a given direction from an upstream location to a destination downstream of the system;
 second conveying means for receiving products from the first conveying means, for accumulation and movement of products, and for delivery of products to the first conveying means for movement to the downstream destination, a section of the second conveying means located in adjacent alignment with the first conveying means, the second conveying means moving in the same direction as the first conveying means at the adjacent alignment;
 guide means for directing products on the first conveying means to the downstream destination and for directing products for accumulation onto the second conveying means, said guide means comprising an outwardly extending section having a tip end; and
 an alignment wheel located adjacent to the first conveying means, said alignment wheel having a vertical rotating shaft through the center of the alignment wheel, the center of the alignment wheel being located in the same vertical plane as the tip end of the guide means, the alignment wheel rotating in the same direction, a direction consistent and in tandem with the direction of the first conveying means, whereby products delivered from the second conveying means to the first conveying means are oriented between the tip end and the alignment wheel for unimpeded movement to the downstream destination.

2. The product conveying and accumulation system as in claim 1 wherein product positioned between the tip end and the alignment wheel are oriented so that they are identically aligned for movement from the upstream location to the downstream destination.

3. The product conveying and accumulation system as in claim 1 wherein the first conveying means moves at a faster linear speed than the second conveying means.

4. The product conveying and accumulation system as in claim 3 wherein the rotational speed of the alignment wheel is the same as the linear speed of the first conveying means.

5. The product conveying and accumulation system as in claim 1 wherein the first conveying means moves at a given linear speed and wherein the rotational speed of the alignment wheel is the same as the linear speed of the first conveying means.

6. The product conveying and accumulation system as in claim 1 wherein when the direction of movement of products on the first conveying means is east to west, the alignment wheel rotates in a counter-clockwise direction.

7. The product conveying and accumulation system as in claim 1 wherein when the direction of movement of products on the first conveying means is west to east, the alignment wheel rotates in a clockwise direction.

8. The product conveying and accumulation system as in claim 1 further comprising an outer guard rail adjacent to and bordering the first conveying means, said outer guard rail having a kick-out rail section, whereby product moving on outboard lanes of the second conveying means for delivery to the first conveying means are caused to shift to inboard lanes of the second conveying means for accumulation and movement of products on the second conveying means.

9. The product conveying and accumulation system as in claim 1 wherein the alignment wheel comprises a plurality of spokes.

10. A product conveying and accumulation system, said system comprising:
 first conveying means for the movement of products in a given direction from an upstream location to a destination downstream of the system;
 second conveying means for receiving products from the first conveying means, for accumulation and movement of products, and for delivery of products to the first conveying means for movement to the downstream destination, the second conveying means moving in the same direction as the first conveying means;
 guide means for directing products on the first conveying means to the downstream destination and for directing products for accumulation onto the second conveying means, said guide means comprising an outwardly extending section having a tip end;
 an outer guard rail adjacent to and bordering the first conveying means whereby a pinch point is created between the tip end and the guard rail;

an alignment wheel located adjacent to the first conveying means, said alignment wheel having a vertical rotating shaft located in the same vertical plane as the pinch point, the alignment wheel rotating in the same direction, a direction consistent and in tandem with the direction of the first conveying means, whereby products delivered from the second conveying means to the first conveying means are oriented between the pinch point and the alignment wheel for unimpeded movement to the downstream destination.

11. The product conveying and accumulation system as in claim 10 wherein products positioned at the pinch point are oriented so that they are identically aligned for movement from the upstream location to the downstream destination.

12. The product conveying and accumulation system as in claim 10 wherein the first conveying means moves at a faster linear speed than the second conveying means.

13. The product conveying and accumulation system as in claim 12 wherein the rotational speed of the alignment wheel is the same as the linear speed of the first conveying means.

14. The product conveying and accumulation system as in claim 10 wherein the first conveying means moves at a given linear speed and wherein the rotational speed of the alignment wheel is the same as the linear speed of the first conveying means.

15. The product conveying and accumulation system as in claim 10 wherein when the direction of movement of products on the first conveying means is east to west, the alignment wheel rotates in a counter-clockwise direction.

16. The product conveying and accumulation system as in claim 10 wherein when the direction of movement of products on the first conveying means is west to east, the alignment wheel rotates in a clockwise direction.

17. The product conveying and accumulation system as in claim 10 wherein said outer guard rail has a kick-out rail section, whereby product moving on outboard lanes of the second conveying means for delivery to the first conveying means are caused to shift to inboard lanes of the second conveying means for accumulation and movement of products on the second conveying means.

18. The product conveying and accumulation system as in claim 10 wherein the alignment wheel comprises a plurality of spokes.

* * * * *